United States Patent
Lin et al.

(10) Patent No.: US 11,322,989 B2
(45) Date of Patent: May 3, 2022

(54) WIRELESS ENERGY EMISSION DEVICE AND ELECTRONIC EQUIPMENT

(71) Applicant: Beijing Xiaomi Mobile Software Co., Ltd., Beijing (CN)

(72) Inventors: Xianqi Lin, Beijing (CN); Yajun Pan, Beijing (CN); Shujun Wei, Beijing (CN); Jian Bai, Beijing (CN); Tuyou Yuan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/087,149

(22) Filed: Nov. 2, 2020

(65) Prior Publication Data
US 2021/0135502 A1 May 6, 2021

(30) Foreign Application Priority Data
Nov. 4, 2019 (CN) .......................... 201911067883.7

(51) Int. Cl.
*H02J 50/23* (2016.01)
*H02J 50/80* (2016.01)
*H02J 50/27* (2016.01)
*H02J 7/00* (2006.01)
*H04B 5/00* (2006.01)

(52) U.S. Cl.
CPC .......... *H02J 50/23* (2016.02); *H02J 7/00309* (2020.01); *H02J 50/27* (2016.02); *H02J 50/80* (2016.02); *H04B 5/0037* (2013.01)

(58) Field of Classification Search
None
See application file for complete search history.

(56) References Cited

U.S. PATENT DOCUMENTS

| | | | |
|---|---|---|---|
| 2010/0295732 A1* | 11/2010 | Lee ........................ | G01S 3/043 342/420 |
| 2016/0301240 A1* | 10/2016 | Zeine ..................... | H02J 50/20 |
| 2016/0372957 A1* | 12/2016 | Blakely .................. | H02J 7/04 |
| 2017/0077995 A1* | 3/2017 | Leabman .............. | H02J 50/402 |

(Continued)

FOREIGN PATENT DOCUMENTS

| CN | 106602746 A | 4/2017 |
|---|---|---|
| CN | 109378590 A | 2/2019 |

OTHER PUBLICATIONS

European Search Report in European Application No. 20204882.3, dated Mar. 5, 2021.

*Primary Examiner* — Jared Fureman
*Assistant Examiner* — Joel Barnett
(74) *Attorney, Agent, or Firm* — Finnegan, Henderson, Farabow, Garrett & Dunner, L.L.P.

(57) ABSTRACT

A wireless energy emission device includes: a receiving antenna array, a signal processing module, and an emitting antenna array; wherein the receiving antenna array includes at least two receiving antennas for receiving a positioning signal emitted by a target device to be powered; the signal processing module is configured to determine an emission parameter according to a phase difference between positioning signals received by any two of the receiving antennas and position information of the emitting antenna array; and the emitting antenna array is configured to emit an energy supply signal to the target device to be powered according to the emission parameter.

14 Claims, 3 Drawing Sheets

(56) References Cited

U.S. PATENT DOCUMENTS

2017/0110909 A1    4/2017  Zeine et al.
2017/0201859 A1*   7/2017  Banerjea .................... G01S 3/48
2018/0166920 A1*   6/2018  Britz ....................... H02J 7/025

* cited by examiner watch # WIRELESS ENERGY EMISSION DEVICE AND ELECTRONIC EQUIPMENT

CROSS-REFERENCE TO RELATED APPLICATION

This application is based upon and claims priority to Chinese Patent Application No. 201911067883.7, filed on Nov. 4, 2019, the entire content of which is incorporated herein by reference.

TECHNICAL FIELD

The present disclosure relates to the technical field of wireless energy supply, and particularly, to a wireless energy emission device and electronic equipment.

BACKGROUND

With the rapid popularization and development of mobile terminals, energy supply of the mobile terminals has become increasingly important. Under such circumstances, wireless energy supply technology provides a new solution for supplying energy to the mobile terminals. For example, a wireless energy emission device is used to emit energy signals in the form of microwaves, and energy is supplied to the mobile terminals through microwave energy transmission.

SUMMARY

According to a first aspect of embodiments of the present disclosure, a wireless energy emission device includes: a receiving antenna array, a signal processing module, and an emitting antenna array; wherein the receiving antenna array includes at least two receiving antennas for receiving a positioning signal emitted by a target device to be powered; the signal processing module is configured to determine an emission parameter according to a phase difference between positioning signals received by any two of the receiving antennas and position information of the emitting antenna array; and the emitting antenna array is configured to emit an energy supply signal to the target device to be powered according to the emission parameter.

According to a second aspect of embodiments of the present disclosure, electronic equipment includes: the wireless energy emission device according to the first aspect.

The wireless energy emission device and electronic equipment provided by the present disclosure have at least the following beneficial effects.

The wireless energy emission device provided by the embodiments of the present disclosure determines the emission parameter by using the phase difference of the positioning signals received by receiving antennas in the receiving antenna array, and uses the emitting antenna array to emit the energy supply signals according to the emission parameter to realize energy supply, which improves the overall energy supply efficiency and user experience.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Terms used in the present disclosure are for the purpose of describing exemplary embodiments only and are not intended to limit the present disclosure. For example, the term "connect" is not limited to physical or mechanical connections, and may include electrical connections, whether direct or indirect. The term "and/or" as used herein refers to and includes any or all possible combinations of one or more of the associated listed items.

In some embodiments, a wireless energy emission device includes a time reversal (TR) antenna array and a processing module. The TR antenna array is configured to receive a positioning signal emitted by a target device to be powered, and the processing module is configured to process the positioning signal received by each TR antenna according to a time reversal algorithm to locate the target device to be powered. In addition, the processing module controls the TR antenna to emit an energy supply signal, so that the energy supply signal is sent to the located position in the form of point focus, so as to realize energy supply for the target device to be powered.

In the embodiments, because the time reversal algorithm may be complicated, a calculation amount may be large, and a calculation time may be long, the positioning timeliness of the target device to be powered may be affected. For example, when the target device to be powered has a high degree of freedom of activity, the target device to be powered may not effectively receive the energy supply signal, thereby reducing the overall energy supply efficiency.

Taking the mobile phone as the target device to be powered as an example, when the user charges the mobile phone with the wireless power emission device during movement, it may take a long time for the wireless power emission device to locate the mobile phone. Therefore, when the wireless power emission device emits the power supply signal, if the position of the user has changed, the power supply signal may not be focused on the mobile phone to be charged, thereby reducing the overall power supply efficiency. To improve the power supply efficiency, embodiments of the present disclosure provide a wireless energy emission device and electronic equipment.

Figure 1:
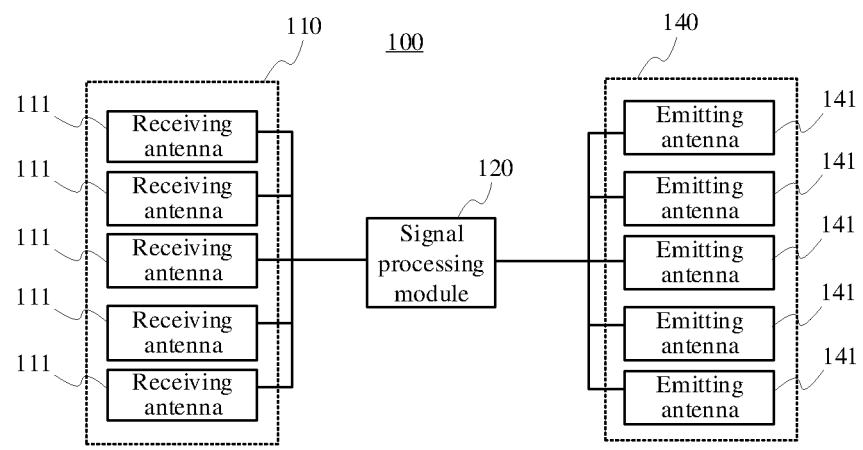
FIG. 1 is a schematic diagram showing a wireless energy emission device according to an exemplary embodiment.

FIG. 1 is a schematic diagram of a wireless energy emission device 100 according to an exemplary embodiment. Referring to FIG. 1, the wireless energy emission device 100 includes a receiving antenna array 110, a signal processing module 120, and an emitting antenna array 140.

The receiving antenna array 110 is configured to receive a positioning signal emitted by a target device to be powered. The receiving antenna array 110 includes at least two receiving antennas 111. Since different receiving antennas 111 have different positions, there is a phase difference between the positioning signals received by the different receiving antennas 111.

The signal processing module 120 may be a processor and is configured to determine an emission parameter according to the phase difference of the positioning signals received by any two receiving antennas 111 in the receiving antenna array 110 and position information of the emitting antenna array 140.

In an embodiment, the receiving antenna array 110 includes more than two receiving antennas 111 so that the receiving antenna array 110 and the signal processing module 120 form a dual-channel phase interferometer. For example, the receiving antenna array 110 includes five receiving antennas 111. Any two of the five receiving antennas 111 are combined to obtain 10 groups of antenna pairs, and each antenna pair determines one phase difference. Therefore, for a positioning signal from one direction, 10 phase differences can be acquired through the receiving antenna array 110.

The signal processing module 120 is configured to compare the phase difference of the positioning signals received by any two receiving antennas 111 in the receiving antenna array 110 with a sample phase difference in a sample library to obtain an incoming wave direction of the positioning signal relative to a center of the receiving antenna array 110. The sample library is obtained by pre-sampling through the receiving antenna array 110. The sample library stores a corresponding relationship between the sample phase differences and different incoming wave directions. Among them, one incoming wave direction corresponds to a group of sample phase differences.

When locating the target device to be powered, the signal processing module 120 uses a preset method, such as a maximum likelihood estimation method, to compare the currently acquired group of phase differences with the plurality of groups of sample phase differences stored in the sample library, and determine the incoming wave direction corresponding to the current positioning signal according to the comparison result. The incoming wave direction includes an azimuth angle and an angle of pitch of the target device to be powered with respect to the center of the receiving antenna array 110, for example, an azimuth angle of 360° and an angle of pitch of ±60° with respect to the center of the receiving antenna array 110. Since the positioning signal is transmitted by the target device to be powered, the target device to be powered can be located by determining the incoming wave direction.

Using such a positioning method may reduce the influence caused by factors such as mutual coupling and inconsistent received signal amplitudes between different receiving antennas 111 in the receiving antenna array 110, and has a high positioning accuracy. In addition, the overall positioning process takes less time, and the positioning result can be quickly obtained based on the positioning signal.

In an embodiment, the signal processing module 120 is further configured to determine an emission parameter according to the incoming wave direction and the position information of the emitting antenna array 140. The emitting antenna array 140 includes at least two emitting antennas 141. In this case, position information of the emitting antenna array 140 includes azimuth information and pitch angle information of the emitting antenna 141. For example, the position information of the emitting antenna array 140 includes azimuth information and pitch angle information of the emitting antenna 141 relative to the center of the receiving antenna array 120.

The signal processing module 120 determines the positional relationship between the emitting antenna array 140 and the target device to be powered. Further, the signal processing module 120 uses a preset method, such as a directional retrospective method, to determine an emission parameter according to the direction of the incoming wave and the position information of the emitting antenna array 140. The emission parameter includes an emission sequence and a beam pointing relationship of the emitting antenna 141, so as to ensure that the energy supply signal emitted by the emitting antenna array 140 is sent to the target device to be powered in the form of point focus.

The emitting antenna array 140 is configured to emit an energy supply signal to the target device to be powered according to the emission parameter determined by the signal processing module 120. The emitting antenna array 140 includes a plurality of emitting antennas 141 to form a phased antenna array. The emission parameter determined by the signal processing module 120 satisfies that the energy supply signal emitted by the emitting antenna array 140 forms a focal point at the target device to be powered, so as to achieve efficient and rapid energy supply to the target device to be powered. In addition, an energy supply signal is emitted through the emitting antenna array 140, and the target device to be powered is aligned without mechanically adjusting the emitting antenna 141.

Figure 2:
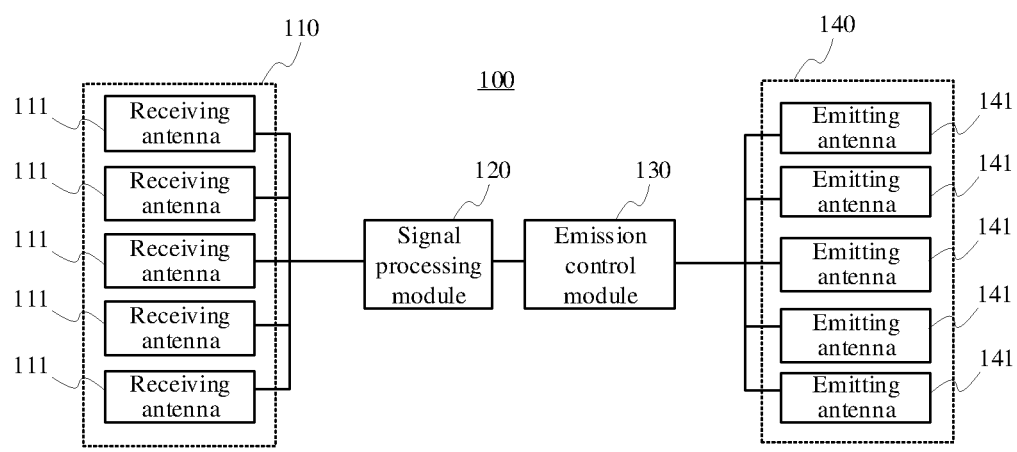
FIG. 2 is a schematic diagram showing a wireless energy emission device according to another exemplary embodiment.

FIG. 2 is a schematic diagram of a wireless energy emission device 100 according to an exemplary embodiment. As shown in FIG. 2, the wireless energy transmission device 100 further includes an emission control module 130. The emission control module 130 is connected to the signal processing module 120 to receive the emission parameter. The emission control module 130 is also connected to the emitting antenna array 140 and is configured to feed the emitting antenna array 140 according to the emission parameter.

Figure 3:
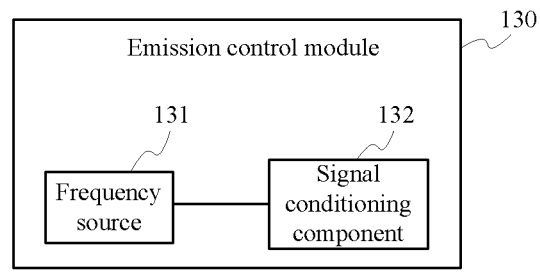
FIG. 3 is a schematic diagram of an emission control module in the wireless energy emission device according to an exemplary embodiment.

FIG. 3 is a schematic diagram of the emission control module 130 according to an exemplary embodiment. As shown in FIG. 3, the emission control module 130 includes a frequency source 131 and a signal conditioning component 132.

The frequency source 131 is a phase-locked point frequency source, and outputs an initial signal of the point frequency phase-lock to facilitate subsequent phase control of the feeding signal of the emitting antenna array 130. In addition, the frequency source 131 is configured to output an initial signal with a frequency of at least 9.6 GHz, for example, the frequency source 131 outputs an initial signal in a millimeter wave frequency band. Therefore, the frequency of the energy supply signal emitted by the emitting antenna array 140 is at least 9.6 GHz. In this way, the directivity of the energy supply signal is improved, and the energy transmission efficiency between the wireless energy emission device 100 and the target device to be powered is optimized. In addition, because the energy supply signal above the frequency of 9.6 GHz has a relatively good directivity, the impact of the space radiation around the target device to be powered on human safety is reduced.

The signal conditioning component 132 is configured to amplify the initial signal at full power, and convert the amplified initial signal into a multi-channel feeding signal according to the emission parameter. Further, the signal conditioning component 132 sends the feeding signal to the emitting antenna array 140, so that the emitting antenna array 140 emits the power supply signal. The signal conditioning component 132 amplifies the initial signal at full power to obtain the feeding signal, thereby improving the energy emitting efficiency of the emitting antenna array 140 and optimizing the overall device performance.

Figure 4:
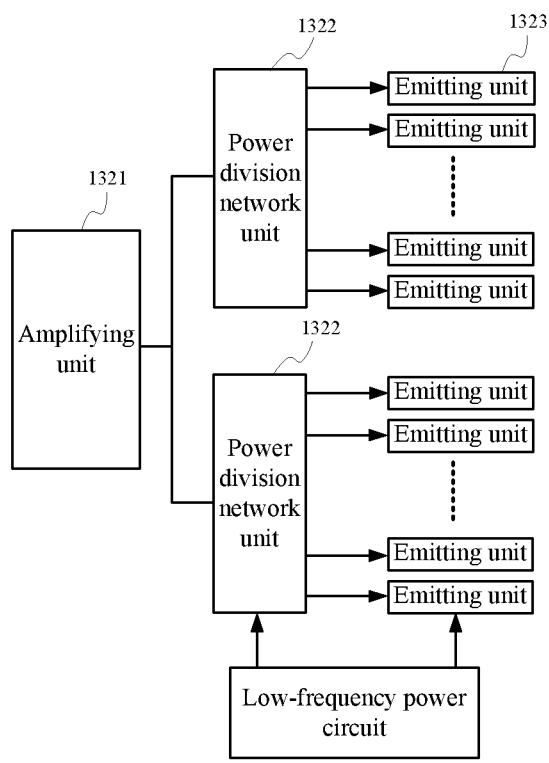
FIG. 4 is a schematic diagram showing a signal conditioning component in the wireless energy emission device according to an exemplary embodiment.

FIG. 4 is a schematic diagram of the signal conditioning component 132 according to an exemplary embodiment. As shown in FIG. 4, the signal conditioning component 132 includes: an amplifying unit 1321, a power division network unit 1322, and a plurality of emitting units 1323.

The amplifying unit 1321 is configured to amplify the initial signal at full power, and convert the amplified initial signal into at least two first intermediate signals of equal amplitude and phase. In an embodiment, the amplifying unit 1321 includes an amplifier. In addition, the amplifying unit 1321 may further include a digital attenuator, which performs a digital attenuation processing on the amplified initial signal to optimize the performance of the first intermediate signal.

The power division network unit 1322 is configured to convert each first intermediate signal into at least two second intermediate signals of equal amplitude and phase. The power division network unit 1322 corresponds to the second intermediate signal one by one. In other words, if the amplification unit 1321 outputs two first intermediate signals, the signal conditioning component 132 includes two power division network units 1322.

The emitting unit 1323 is configured to amplify the second intermediate signal at full power, and perform beam control on each amplified second intermediate signal according to the emission parameter to obtain a feeding signal, and then send the feeding signal to the emitting antenna array 140. In an embodiment, the emitting unit 1323 includes a phase shifter, and the phase shifter performs a precise phase adjustment on each amplified second intermediate signal according to the emission parameter to obtain the feeding signal.

Taking the emitting antenna array 140 as a 144-channel emitting antenna array as an example, the emitting antenna array 140 needs 24 feeding signals. With reference to FIG. 4, the signal conditioning process of the signal conditioning component 142 is as follows.

In step 1, the amplifying unit 1321 amplifies the initial signal at full power to obtain two first intermediate signals.

In step 2, two power division network units 1322 respectively receive the first intermediate signals, and each of the power division network units 1322 converts one channel of the first intermediate signals into 12 channels of the second intermediate signal. At this time, 24 channels of the second intermediate signals are obtained through the power division network units 1322.

In step 3, the 24 emitting units 1323 receive the 24 channels of the second intermediate signals in a one-to-one correspondence manner, and obtain 24 channels of feeding signals after amplification and phase adjustment.

In addition, the power division network unit 1322 and the emitting unit 1323 in the emission control module 130 are connected to a low-frequency power circuit to maintain normal use.

The wireless energy emission device 100 provided by the embodiments of the present disclosure has the characteristics of rapid positioning and good timeliness, can quickly and accurately locate the target device to be powered, and ensure that the energy supply signal is effectively received by the target device to be powered. In addition, when emitting the energy supply signal, there is no need to mechanically steer the emission device 100, which is convenient to use.

In an embodiment, the emission control module 130 forms an integrated package structure through a casing. In this case, the emission control module 130 further includes a temperature monitor, such as a temperature control circuit, and the temperature monitor is configured to monitor the temperature of the casing of the emission control module 130.

When the casing temperature exceeds a specified temperature threshold, for example, 30° C., 35° C., or 40° C., the frequency source 131 and/or the signal conditioning component 132 are disabled. When disabling the signal conditioning component 132 may be implemented by disabling the amplifying unit 1321. In this way, when the temperature of the casing is too high, the wireless energy emission device 100 no longer emits the energy supply signal, so as to prevent the high temperature of the device from affecting the user experience and even causing security risks.

In an embodiment, the temperature monitor is further configured to re-enable the frequency source 131 and/or the signal conditioning component 132 when the temperature of the casing is lowered to a specified temperature threshold or below the specified temperature threshold, so that the emission control module 130 feeds power to the emitting antenna array 140 again.

In an embodiment, the wireless energy emission device 100 further includes a biological monitoring and control module. The biological monitoring and control module is configured to obtain distance information between the target device to be powered and a living being, and control the emission power of the emitting antenna array 140 according to the obtained distance information.

As an example, when obtaining the distance information, the biological monitoring and control module is configured to receive the distance information between the target device to be powered and the living being sent by the target device to be powered.

For example, the mobile phone is taken as the target device to be powered. The mobile phone determines the distance information between the living being and the mobile phone through monitoring means such as infrared and image recognition, and sends the distance information to the biological monitoring and control module of the wireless energy emission device 100. In an embodiment, the distance information is an actual distance value between the living being and the target device to be powered, or the distance information is a preset signal capable of characterizing the distance relationship between the living being and the target device to be powered.

As another example, when obtaining the distance information, the biological monitoring and control module is configured to: obtain the position information of the living being to the wireless energy emission device 100, and the positioning information of the target device to be powered to the wireless energy emission device 100; and then obtain the distance information according to the position information of the living being and the positioning information of the target device to be powered.

The position information of the living being includes a distance and a direction of the living being relative to the wireless energy emission device 100. In an embodiment, the position information of the living being is acquired by the biological monitoring and control module through infrared, ultrasonic and other methods. The positioning information of the target device to be powered includes the distance and direction of the target device to be powered relative to the wireless energy emission device 100. In an embodiment, the positioning information is acquired by the signal processing module 120 according to the positioning signal and sent to the biological monitoring and control module.

The biological monitoring and control module is configured to determine whether the distance from the living being to the target device to be powered is within a specified threshold according to the received distance information; and if so, reduce the emission power of the emitting antenna array 140 to a biosafety power. In an embodiment, the biological monitoring and control module controls the emission control module 130 to regulate the emission power of the emitting antenna array 140. The biosafety power may be based on the human body, and the specific value can be determined by referring to industry or national standards.

In this way, the use safety of the wireless energy transmission device 100 is guaranteed. Taking the use scenario of using the mobile phone by the user as an example, when the wireless energy emission device 100 determines that the distance between the current user and the mobile phone is within a specified threshold range, for example, the user holds the mobile phone, according to the received distance information, the emission control module 130 is controlled to adjust the emission power such that the emitting antenna array 140 emits the energy supply signal at a safe power.

Figure 5:
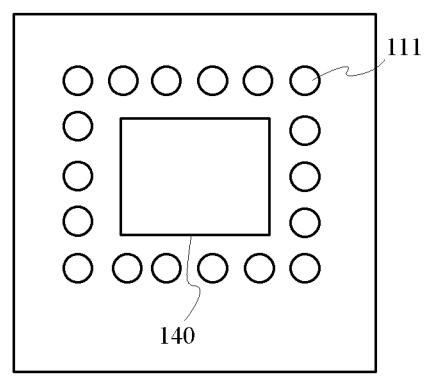
FIG. 5 is a schematic diagram showing a wireless energy emission device according to another exemplary embodiment.

In the wireless energy emission device 100, the receiving antenna array 110, the signal processing module 120, the emission control module 130, and the emitting antenna array 140 may be integrated on the same circuit board. In addition, the receiving antennas 111 in the receiving antenna array 110 may be distributed around the emitting antenna array 140. For example, as shown in FIG. 5, a plurality of receiving antennas 111 are distributed around the emitting antenna array 140 in a rectangular manner. In this way, the structure integration of the overall device 100 is improved and installation is facilitated.

In the embodiments, the plurality of receiving antennas 111 in the receiving antenna array 110 respectively receive a positioning signal sent by the target device to be powered. The signal processing module 120 obtains the phase difference between the positioning signals received any two receiving antennas 111 according to the positioning signals received by the plurality of receiving antennas 111. In addition, the signal processing module 120 compares the currently obtained group of phase differences with the sample phase differences stored in the sample library to determine the incoming wave direction of the positioning signal. Further, the signal processing module 120 determines the emission parameter according to the incoming wave direction and the position information of the emitting antenna array 140. The emission control module 130 feeds power to the emitting antenna array 140 according to the emission parameter, so that the emitting antenna array 140 emits the energy supply signal to the target device to be powered.

With the wireless energy emission device 100 provided in the embodiments of the present disclosure, it is possible to emit the energy supply signal with an efficiency of 32.21% and a power of 80 W, thereby achieving high-efficiency wireless energy emission.

Furthermore, the target device to be powered sends a positioning signal in real time, and the wireless energy emission device 100 receives the positioning signal in real time. When the position of the target device to be powered changes, the wireless energy emission device 100 adjusts the power supply signal in real time according to the currently received positioning signal, so that the power supply signal is always focused on the target device to be powered.

In addition, during the use of the wireless energy emission device 100, a temperature monitor in the emission control module 130 monitors the temperature of the casing of the emission control module 130 in real time. When the temperature of the casing exceeds a specified temperature threshold, the emission control module 130 is regulated to stop emitting the energy supply signal.

The biological monitoring and control module acquires the distance information between the target device to be powered and the living being in real time. When it is determined according to the distance information that the distance from the living being to the target device to be powered is within a specified threshold range, the emission control module 130 is controlled to reduce the emission power of the power supply signal to the biosafety power.

The wireless energy emission device 100 provided in the embodiments of the present disclosure has the characteristics of accurate positioning and fast positioning timeliness, and can cooperate with a target device to be powered with a high degree of freedom of movement. In addition, the overall energy emission process has high energy supply efficiency, safety and reliability, supports fast charging for the target device to be powered, and optimizes the user experience.

Embodiments of the present disclosure further provide electronic equipment including the wireless energy emission device described above. In an embodiment, the electronic equipment is a smart household product, such as a lighting device, a voice playback device, a display device, and the like.

Those skilled in the art will readily contemplate other embodiments of the present disclosure after considering the specification and practicing the disclosure disclosed herein. The present disclosure is intended to cover any variations, uses, or adaptations of the present disclosure that follow the general principles of the present disclosure and include the common general knowledge or conventional technical means in the technical field not disclosed by the present disclosure. It is intended that the specification and embodiments are considered as exemplary only, with a true scope and spirit of the present disclosure being indicated by the appended claims.

What is claimed is:

1. A wireless energy emission device, comprising:
  a receiving antenna array, a signal processing module, an emitting antenna array, and an emission control module; wherein:
  the receiving antenna array comprises at least two receiving antennas for receiving a positioning signal emitted by a target device to be powered;
  the signal processing module is configured to determine an emission parameter according to a phase difference between positioning signals received by any two of the receiving antennas and position information of the emitting antenna array;

the emitting antenna array is configured to emit an energy supply signal to the target device to be powered according to the emission parameter; and the emission control module is configured to feed power to the emitting antenna array according to the emission parameter, so that the emitting antenna array emits the energy supply signal;

wherein the emission control module comprises a frequency source configured to output an initial signal with a frequency of at least 9.6 GHz, and a signal conditioning component configured to: amplify the initial signal at a full power, convert the amplified initial signal into at least two feeding signals according to the emission parameter, and send the feeding signals to the emitting antenna array;

wherein the signal conditioning component comprises:

an amplifying unit configured to amplify the initial signal at the full power and convert the amplified initial signal into at least two first intermediate signals with same amplitude and phase;

a power division network unit configured to convert each of the first intermediate signals into at least two second intermediate signals with same amplitude and phase; and a plurality of emitting units configured to: amplify each of the second intermediate signals at a full power, perform a beam control on each amplified second intermediate signal according to the emission parameter to obtain the feeding signals, and send the feeding signals to the emitting antenna array.

2. The wireless energy emission device according to claim 1, wherein the signal processing module is configured to:

compare the phase difference with a sample phase difference in a sample library to obtain an incoming wave direction of the positioning signal relative to a center of the receiving antenna array; and determine the emission parameter according to the incoming wave direction and the position information of the emitting antenna array;

wherein the sample library stores a corresponding relationship between the sample phase difference and the incoming wave direction.

3. The wireless energy transmission device according to claim 1, wherein the emission parameter comprises: an emission sequence and a beam pointing relationship of an emitting antenna in the emitting antenna array.

4. The wireless energy emission device according to claim 1, wherein the emission control module further comprises:

a temperature monitor, configured to, in response to a casing temperature of the emission control module exceeding a specified temperature threshold, disable at least one of the frequency source or the signal conditioning component.

5. The wireless energy emission device according to claim 1, further comprising:

a biological monitoring and control module, configured to obtain distance information of the target device to be powered and a living being, and control an emission power of the emitting antenna array according to the distance information.

6. The wireless energy emission device according to claim 5, wherein when obtaining the distance information, the biological monitoring and control module is configured to perform one of:

receiving the distance information of the target device to be powered and the living being that is sent by the target device to be powered; or obtaining first position information from the living being to the wireless energy emission device, and second positioning information from the target device to be powered to the wireless energy emission device; and obtain the distance information according to the first position information and the second positioning information.

7. The wireless energy emission device according to claim 6, wherein the biological monitoring and control module is further configured to:

determine according to the distance information whether a distance from the living being to the target device to be powered is within a specified threshold range; and if yes, reduce the emission power of the emitting antenna array to a biological safety power.

8. The wireless energy emission device according to claim 1, wherein the receiving antenna array, the signal processing module, and the emitting antenna array are integrated on a same circuit board; and the receiving antennas in the receiving antenna array are distributed around the emitting antenna array.

9. Electronic equipment, comprising: a wireless energy emission device, the wireless energy emission device comprising:

a receiving antenna array, a signal processing module, an emitting antenna array, and an emission control module; wherein:

the receiving antenna array comprises at least two receiving antennas for receiving a positioning signal emitted by a target device to be powered;

the signal processing module is configured to determine an emission parameter according to a phase difference between positioning signals received by any two of the receiving antennas and position information of the emitting antenna array;

the emitting antenna array is configured to emit an energy supply signal to the target device to be powered according to the emission parameter; and the emission control module is configured to feed power to the emitting antenna array according to the emission parameter, so that the emitting antenna array emits the energy supply signal;

wherein the emission control module comprises a frequency source configured to output an initial signal with a frequency of at least 9.6 GHz, and a signal conditioning component configured to: amplify the initial signal at a full power, convert the amplified initial signal into at least two feeding signals according to the emission parameter, and send the feeding signals to the emitting antenna array;

wherein the signal conditioning component comprises:

an amplifying unit configured to amplify the initial signal at the full power and convert the amplified initial signal into at least two first intermediate signals with same amplitude and phase;

a power division network unit configured to convert each of the first intermediate signals into at least two second intermediate signals with same amplitude and phase; and a plurality of emitting units configured to: amplify each of the second intermediate signals at a full power, perform a beam control on each amplified second intermediate signal according to the emission parameter to obtain the feeding signals, and send the feeding signals to the emitting antenna array.

10. The electronic equipment according to claim 9, wherein the signal processing module is configured to:
   compare the phase difference with a sample phase difference in a sample library to obtain an incoming wave direction of the positioning signal relative to a center of the receiving antenna array; and
   determine the emission parameter according to the incoming wave direction and the position information of the emitting antenna array;
   wherein the sample library stores a corresponding relationship between the sample phase difference and the incoming wave direction.

11. The electronic equipment according to claim 9, wherein the emission parameter comprises: an emission sequence and a beam pointing relationship of an emitting antenna in the emitting antenna array.

12. The electronic equipment according to claim 9, wherein the emission control module further comprises:
   a temperature monitor, configured to, in response to a casing temperature of the emission control module exceeding a specified temperature threshold, disable at least one of the frequency source or the signal conditioning component.

13. The electronic equipment according to claim 9, wherein the wireless energy emission device further comprises:
   a biological monitoring and control module, configured to obtain distance information of the target device to be powered and a living being, and control an emission power of the emitting antenna array according to the distance information.

14. The electronic equipment according to claim 13, wherein when obtaining the distance information, the biological monitoring and control module is configured to perform one of:
   receiving the distance information of the target device to be powered and the living being that is sent by the target device to be powered; or
   obtaining first position information from the living being to the wireless energy emission device, and second positioning information from the target device to be powered to the wireless energy emission device; and obtain the distance information according to the first position information and the second positioning information.

* * * * *